(12) United States Patent
Bogumil et al.

(10) Patent No.: US 11,852,756 B2
(45) Date of Patent: Dec. 26, 2023

(54) RADIOGRAPHIC DETECTOR READOUT

(71) Applicant: CARESTREAM HEALTH, INC., Rochester, NY (US)

(72) Inventors: Todd D. Bogumil, Rochester, NY (US); Ravi K. Mruthyunjaya, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 17/778,420

(22) PCT Filed: Dec. 14, 2020

(86) PCT No.: PCT/US2020/064802
§ 371 (c)(1),
(2) Date: May 20, 2022

(87) PCT Pub. No.: WO2021/126744
PCT Pub. Date: Jun. 24, 2021

(65) Prior Publication Data
US 2023/0014593 A1 Jan. 19, 2023

Related U.S. Application Data

(60) Provisional application No. 62/950,140, filed on Dec. 19, 2019.

(51) Int. Cl.
*G01T 1/16* (2006.01)
*G01T 1/24* (2006.01)

(52) U.S. Cl.
CPC . *G01T 1/16* (2013.01); *G01T 1/24* (2013.01)

(58) Field of Classification Search
CPC ......................................................... G01T 1/16
See application file for complete search history.

(56) References Cited

U.S. PATENT DOCUMENTS

| | | | | |
|---|---|---|---|---|
| 6,303,943 B1 * | 10/2001 | Yu | ......................... | B82Y 10/00 |
| | | | | 257/431 |
| 6,525,819 B1 * | 2/2003 | Delawter | ................. | G01J 3/50 |
| | | | | 433/29 |
| 7,897,927 B2 | 3/2011 | Black et al. | | |
| 8,678,649 B2 | 3/2014 | Bechard et al. | | |
| 2004/0016886 A1 * | 1/2004 | Ringermacher | ...... | G01T 1/2018 |
| | | | | 250/363.02 |

(Continued)

FOREIGN PATENT DOCUMENTS

| | | |
|---|---|---|
| JP | 2017-532540 | 11/2017 |
| WO | 2018/118847 | 6/2018 |

OTHER PUBLICATIONS

International Search Report dated Mar. 15, 2021 for International Application No. PCT/US2020/064802, 3 pages.

*Primary Examiner* — Hugh Maupin

(57) ABSTRACT

A flexible digital radiographic detector assembly includes a flexible sleeve enclosing a photosensor array supported by a flexible substrate. Integrated circuit readout electronics are coupled to the photosensor array and to a circuit board having conductive contacts. The contacts engage a hand carried read out electronics box to initiate a read out of image data captured in the photosensor array and to display the image data on a screen in the read out electronics box.

19 Claims, 11 Drawing Sheets

(56) References Cited

U.S. PATENT DOCUMENTS

| | | | |
|---|---|---|---|
| 2007/0053498 A1* | 3/2007 | Mandelkern | G01T 7/00 378/184 |
| 2010/0078565 A1 | 4/2010 | Tsubota et al. | |
| 2015/0060676 A1* | 3/2015 | Couture | G01T 1/20 250/361 R |
| 2016/0370303 A1* | 12/2016 | Schmitz | G01N 23/083 |

* cited by examiner

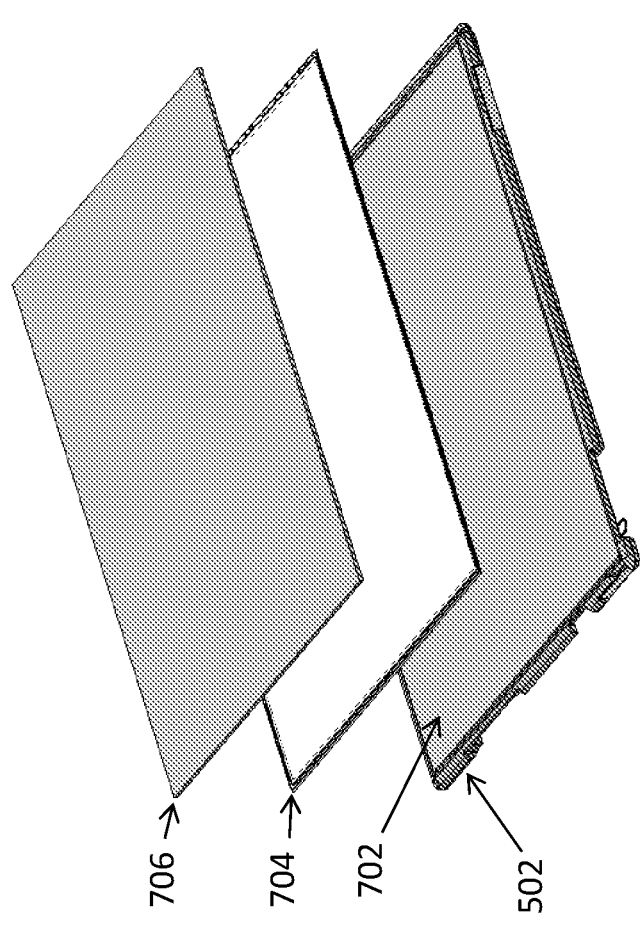
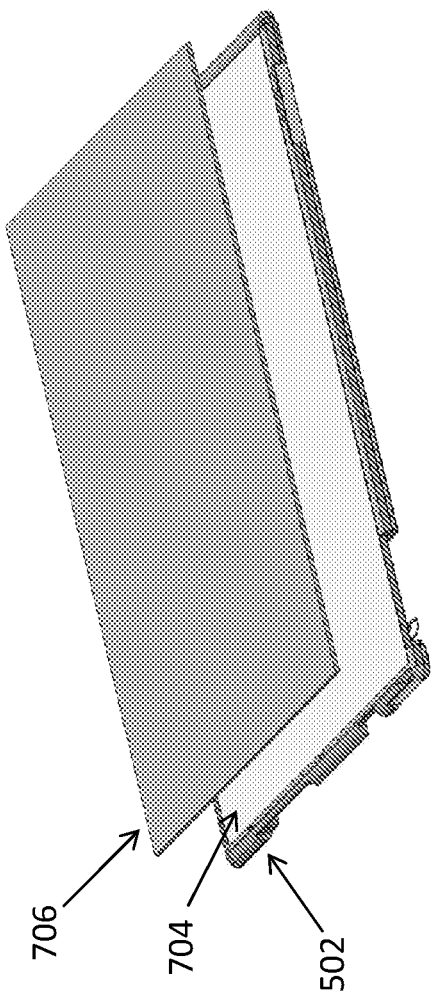
FIG. 7A
FIG. 7B

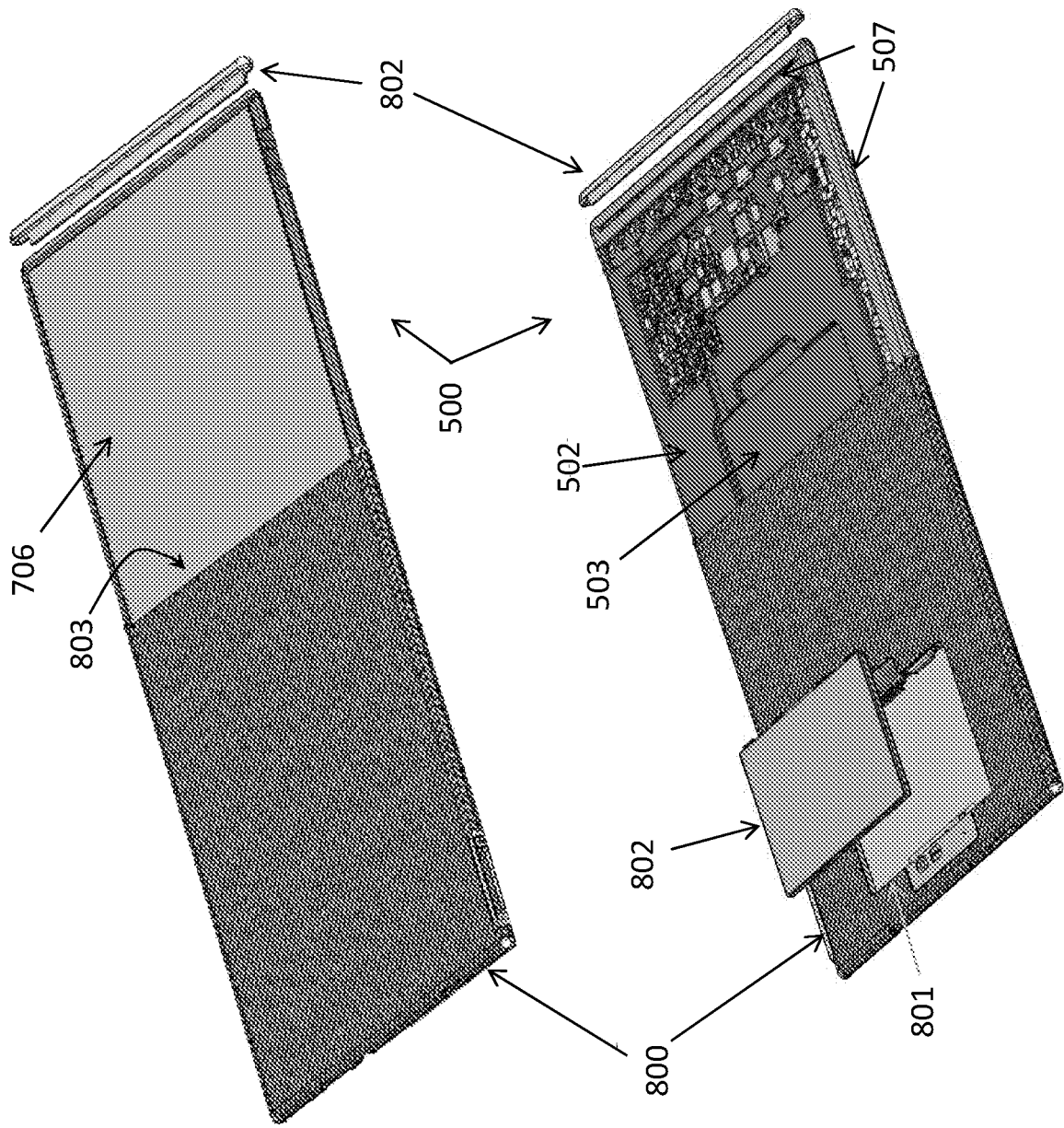

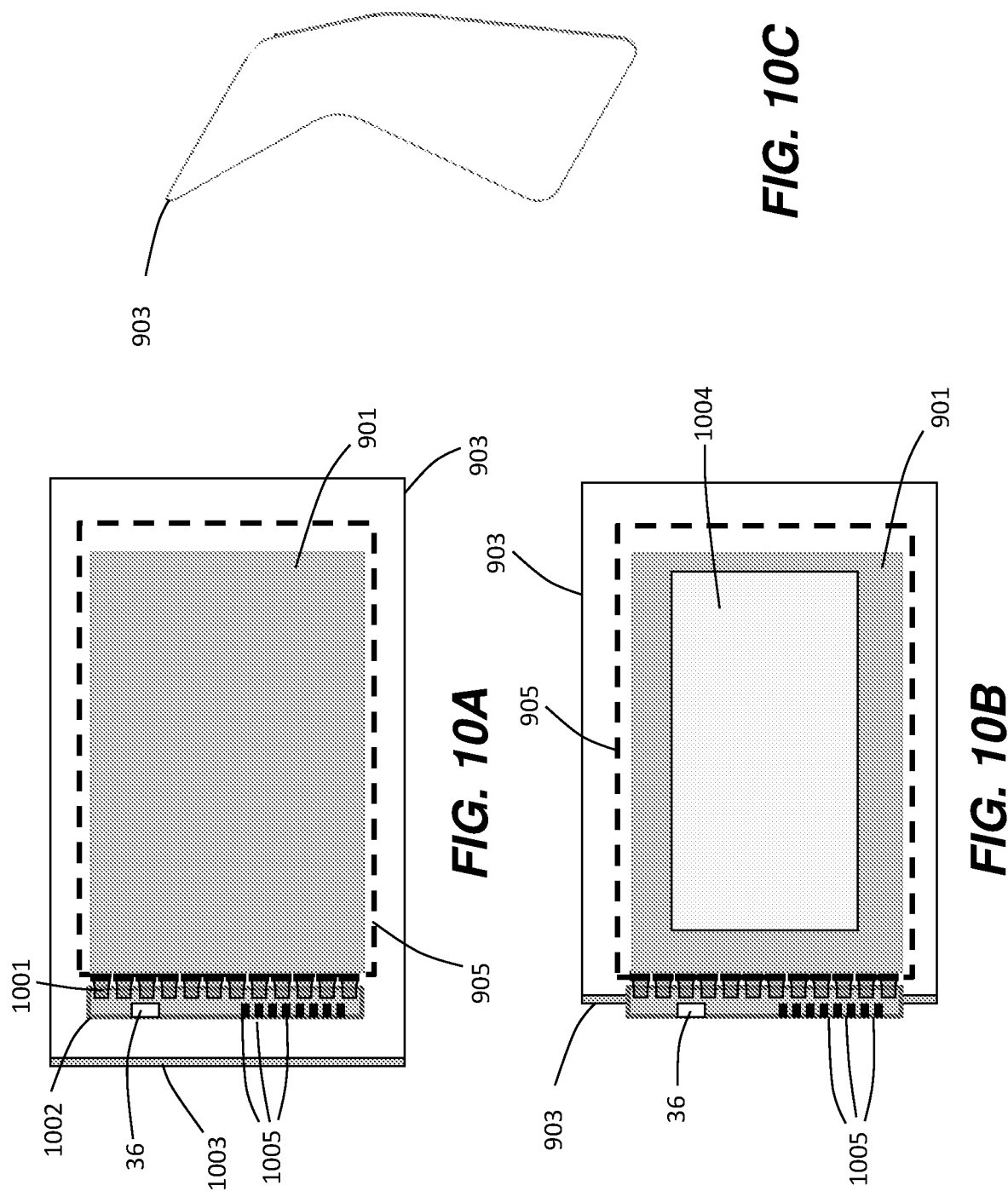

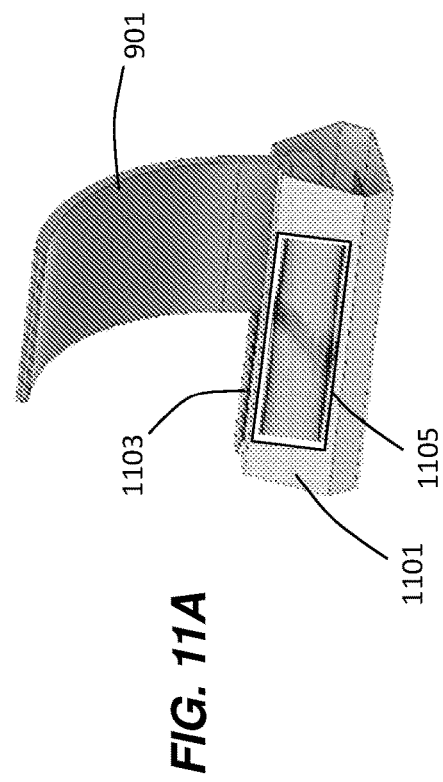
FIG. 11A
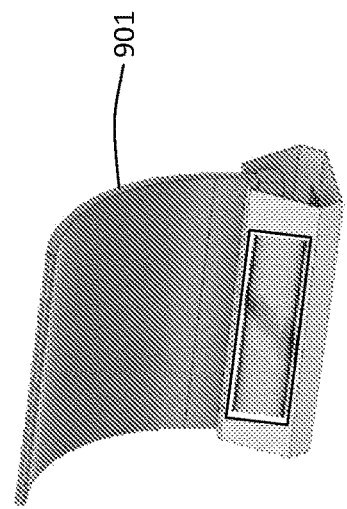
FIG. 11B
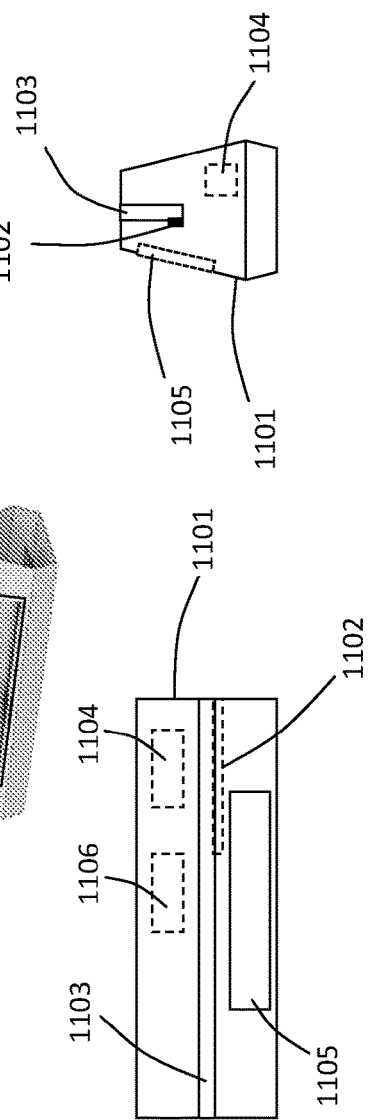
FIG. 11C
FIG. 11D

RADIOGRAPHIC DETECTOR READOUT

CROSS REFERENCE TO RELATED APPLICATIONS

This application claims the benefit of and is a U.S. National Phase filing of PCT Application PCT/US2020/04802 filed Dec. 14, 2020 entitled "RADIOGRAPHIC DETECTOR READOUT", in the name of Bogumil et al., which claims benefit of U.S. Patent Application Ser. No. 62/950,140, filed Dec. 19, 2019, in the name of Bogumil et al., and entitled RADIOGRAPHIC DETECTOR READOUT.

BACKGROUND OF THE INVENTION

The subject matter disclosed herein relates to digital radiographic (DR) detectors.

Portable digital radiographic detectors have been widely deployed to improve x-ray imaging productivity, x-ray image quality and ease of use. In particular, industrial radiographic imaging is often conducted in challenging outdoor environmental locations. This type of imaging procedure is best served by a portable detector that is light weight, flexible and durable to improve ease of use and reliability.

Current digital radiographic detectors typically include an amorphous two-dimensional silicon TFT/photo diode image sensor array that is fabricated on glass using semiconductor processes that are similar to those used for flat panel displays. A scintillator is combined with the image sensor array along with required electronics for signal readout and processing supported by an internal core plate, all of which are contained within a durable enclosure to create the portable DR detector.

FIG. 1 is a perspective view of a digital radiographic (DR) imaging system 10 that may include a generally curved or planar DR detector 40 (shown in a planar embodiment and without a housing for clarity of description), an x-ray source 14 configured to generate radiographic energy (x-ray radiation), and a digital monitor, or electronic display, 26 configured to display images captured by the DR detector 40, according to one embodiment. The DR detector 40 may include a two dimensional array 12 of detector cells 22 (photosensors), arranged in electronically addressable rows and columns. The DR detector 40 may be positioned to receive x-rays 16 passing through a subject 20 during a radiographic energy exposure, or radiographic energy pulse, emitted by the x-ray source 14. As shown in FIG. 1, the radiographic imaging system 10 may use an x-ray source 14 that emits collimated x-rays 16, e.g. an x-ray beam, selectively aimed at and passing through a preselected region 18 of the subject 20. The x-ray beam 16 may be attenuated by varying degrees along its plurality of rays according to the internal structure of the subject 20, which attenuated rays are detected by the array 12 of photosensitive detector cells 22. The curved or planar DR detector 40 is positioned, as much as possible, in a perpendicular relation to a substantially central ray 17 of the plurality of rays 16 emitted by the x-ray source 14. In a curved array embodiment, the source 14 may be centrally positioned such that a larger percentage, or all, of the photosensitive detector cells are positioned perpendicular to incoming x-rays from the centrally positioned source 14. The array 12 of individual photosensitive cells (pixels) 22 may be electronically addressed (scanned) by their position according to column and row. As used herein, the terms "column" and "row" refer to the vertical and horizontal arrangement of the photosensor cells 22 and, for clarity of description, it will be assumed that the rows extend horizontally and the columns extend vertically. However, the orientation of the columns and rows is arbitrary and does not limit the scope of any embodiments disclosed herein. Furthermore, the term "subject" may be illustrated as a human patient in the description of FIG. 1, however, a subject of a DR imaging system, as the term is used herein, may be a human, an animal, an inanimate object, or a portion thereof.

In one exemplary embodiment, the rows of photosensitive cells 22 may be scanned one or more at a time by electronic scanning circuit 28 so that the exposure data from the array 12 may be transmitted to electronic read-out circuit 30. Each photosensitive cell 22 may independently store a charge proportional to an intensity, or energy level, of the attenuated radiographic radiation, or x-rays, received and absorbed in the cell. Thus, each photosensitive cell, when read-out, provides information defining a pixel of a radiographic image 24, e.g. a brightness level or an amount of energy absorbed by the pixel, that may be digitally decoded by image processing electronics 34 and transmitted to be displayed by the digital monitor 26 for viewing by a user. An electronic bias circuit 32 is electrically connected to the two-dimensional detector array 12 to provide a bias voltage to each of the photosensitive cells 22.

Each of the bias circuit 32, the scanning circuit 28, and the read-out circuit 30, may communicate with an acquisition control and image processing unit 34 over a connected cable 33 (wired), or the DR detector 40 and the acquisition control and image processing unit 34 may be equipped with a wireless transmitter and receiver to transmit radiographic image data wirelessly 35 to the acquisition control and image processing unit 34. The acquisition control and image processing unit 34 may include a processor and electronic memory (not shown) to control operations of the DR detector 40 as described herein, including control of circuits 28, 30, and 32, for example, by use of programmed instructions, and to store and process image data. The acquisition control and image processing unit 34 may also be used to control activation of the x-ray source 14 during a radiographic exposure, controlling an x-ray tube electric current magnitude, and thus the fluence of x-rays in x-ray beam 16, and/or the x-ray tube voltage, and thus the energy level of the x-rays in x-ray beam 16. A portion or all of the acquisition control and image processing unit 34 functions may reside in the detector 40 in an on-board processing system 36 which may include a processor and electronic memory to control operations of the DR detector 40 as described herein, including control of circuits 28, 30, and 32, by use of programmed instructions, and to store and process image data similar to the functions of standalone acquisition control and image processing system 34. The image processing system may perform image acquisition and image disposition functions as described herein. The image processing system 36 may control image transmission and image processing and image correction on board the detector 40 based on instructions or other commands transmitted from the acquisition control and image processing unit 34, and transmit corrected digital image data therefrom. Alternatively, acquisition control and image processing unit 34 may receive raw image data from the detector 40 and process the image data and store it, or it may store raw unprocessed image data in local memory, or in remotely accessible memory.

With regard to a direct detection embodiment of DR detector 40, the photosensitive cells 22 may each include a sensing element sensitive to x-rays, i.e. it absorbs x-rays and generates an amount of charge carriers in proportion to a magnitude of the absorbed x-ray energy. A switching element may be configured to be selectively activated to read out the charge level of a corresponding x-ray sensing element. With regard to an indirect detection embodiment of DR detector 40, photosensitive cells 22 may each include a sensing element sensitive to light rays in the visible spectrum, i.e. it absorbs light rays and generates an amount of charge carriers in proportion to a magnitude of the absorbed light energy, and a switching element that is selectively activated to read the charge level of the corresponding sensing element. A scintillator, or wavelength converter, may be disposed over the light sensitive sensing elements to convert incident x-ray radiographic energy to visible light energy. Thus, in the embodiments disclosed herein, it should be noted that the DR detector 40 (or DR detector 300 in FIG. 3 or DR detector 400 in FIG. 4) may include an indirect or direct type of DR detector.

Examples of sensing elements used in sensing array 12 include various types of photoelectric conversion devices (e.g., photosensors) such as photodiodes (P-N or PIN diodes), photo-capacitors (MIS), photo-transistors or photoconductors. Examples of switching elements used for signal read-out include a-Si TFTs, oxide TFTs, MOS transistors, bipolar transistors and other p-n junction components.

FIG. 2 is a schematic diagram 240 of a portion of a two-dimensional array 12 for a DR detector 40. The array of photosensor cells 212, whose operation may be consistent with the photosensor array 12 described above, may include a number of hydrogenated amorphous silicon (a-Si:H) n-i-p photodiodes 270 and thin film transistors (TFTs) 271 formed as field effect transistors (FETs) each having gate (G), source (S), and drain (D) terminals. In embodiments of DR detector 40 disclosed herein, such as a multilayer DR detector (400 of FIG. 4), the two-dimensional array of photosensor cells 12 may be formed in a device layer that abuts adjacent layers of the DR detector structure, which adjacent layers may include a rigid glass layer or a flexible polyimide layer or a layer including carbon fiber without any adjacent rigid layers. A plurality of gate driver circuits 228 may be electrically connected to a plurality of gate lines 283 which control a voltage applied to the gates of TFTs 271, a plurality of readout circuits 230 may be electrically connected to data lines 284, and a plurality of bias lines 285 may be electrically connected to a bias line bus or a variable bias reference voltage line 232 which controls a voltage applied to the photodiodes 270. Charge amplifiers 286 may be electrically connected to the data lines 284 to receive signals therefrom. Outputs from the charge amplifiers 286 may be electrically connected to a multiplexer 287, such as an analog multiplexer, then to an analog-to-digital converter (ADC) 288, or they may be directly connected to the ADC, to stream out the digital radiographic image data at desired rates. In one embodiment, the schematic diagram of FIG. 2 may represent a portion of a DR detector 40 such as an a-Si:H based indirect flat panel, curved panel, or flexible panel imager.

Incident x-rays, or x-ray photons, 16 are converted to optical photons, or light rays, by a scintillator, which light rays are subsequently converted to electron-hole pairs, or charges, upon impacting the a-Si:H n-i-p photodiodes 270. In one embodiment, an exemplary detector cell 222, which may be equivalently referred to herein as a pixel, may include a photodiode 270 having its anode electrically connected to a bias line 285 and its cathode electrically connected to the drain (D) of TFT 271. The bias reference voltage line 232 can control a bias voltage of the photodiodes 270 at each of the detector cells 222. The charge capacity of each of the photodiodes 270 is a function of its bias voltage and its capacitance. In general, a reverse bias voltage, e.g. a negative voltage, may be applied to the bias lines 285 to create an electric field (and hence a depletion region) across the pn junction of each of the photodiodes 270 to enhance its collection efficiency for the charges generated by incident light rays. The image signal represented by the array of photosensor cells 212 may be integrated by the photodiodes while their associated TFTs 271 are held in a non-conducting (off) state, for example, by maintaining the gate lines 283 at a negative voltage via the gate driver circuits 228. The photosensor cell array 212 may be read out by sequentially switching rows of the TFTs 271 to a conducting (on) state by means of the gate driver circuits 228. When a row of the pixels 22 is switched to a conducting state, for example by applying a positive voltage to the corresponding gate line 283, collected charge from the photodiode in those pixels may be transferred along data lines 284 and integrated by the external charge amplifier circuits 286. The row may then be switched back to a non-conducting state, and the process is repeated for each row until the entire array of photosensor cells 212 has been read out. The integrated signal outputs are transferred from the external charge amplifiers 286 to an analog-to-digital converter (ADC) 288 using a parallel-to-serial converter, such as multiplexer 287, which together comprise read-out circuit 230.

This digital image information may be subsequently processed by image processing system 34 to yield a digital image which may then be digitally stored and immediately displayed on monitor 26, or it may be displayed at a later time by accessing the digital electronic memory containing the stored image. The flat panel DR detector 40 having an imaging array as described with reference to FIG. 2 is capable of both single-shot (e.g., static, radiographic) and continuous (e.g., fluoroscopic) image acquisition.

FIG. 3 shows a perspective view of an exemplary prior art generally rectangular, planar, portable wireless DR detector 300 according to an embodiment of DR detector 40 disclosed herein. The DR detector 300 may include a flexible substrate to allow the DR detector to capture radiographic images in a curved orientation. The flexible substrate may be fabricated in a permanent curved orientation, or it may remain flexible throughout its life to provide an adjustable curvature in two or three dimensions, as desired. The DR detector 300 may include a similarly flexible housing portion 314 that surrounds a multilayer structure, or core, comprising a flexible photosensor array portion 22 of the DR detector 300. The housing portion 314 of the DR detector 300 may include a continuous, rigid or flexible, x-ray opaque material or, as used synonymously herein a radio-opaque material, surrounding an interior volume of the DR detector 300. The housing portion 314 may include four flexible edges 318, extending between the top side 321 and the bottom side 322, and arranged substantially orthogonally in relation to the top and bottom sides 321, 322. The bottom side 322 may be continuous with the four edges and disposed opposite the top side 321 of the DR detector 300. The top side 321 comprises a top cover 312 attached to the housing portion 314 which, together with the housing portion 314, substantially encloses the core in the interior volume of the DR detector 300. The top cover 312 may be attached to the housing 314 to form a seal therebetween, and be made of a material that passes x-rays 16 without significant attenuation thereof, i.e., an x-ray transmissive material or, as used synonymously herein, a radiolucent material, such as a carbon fiber, carbon fiber embedded plastic, polymeric, elastomeric and other plastic based material.

With reference to FIG. 4, there is illustrated in schematic form an exemplary cross-section view along section 4-4 of the exemplary embodiment of the DR detector 300 (FIG. 3). For spatial reference purposes, one major surface, or side, of the DR detector 400 may be referred to as the top side 451 and a second major surface, or side, of the DR detector 400 may be referred to as the bottom side 452, as used herein. The core layers, or sheets, may be disposed within the interior volume 450 enclosed by the housing 314 and top cover 312 and may include a flexible curved or planar scintillator layer 404 over a curved or planar the two-dimensional imaging sensor array 12 shown schematically as the device layer 402. A flexible scintillator layer 404 may be directly under (e.g., directly connected to) the substantially planar top cover 312, and the imaging array 402 may be directly under the flexible scintillator 404. Alternatively, a flexible layer 406 may be positioned between the flexible scintillator layer 404 and the top cover 312 as part of the core layered structure to allow adjustable curvature of the core layered structure and/or to provide shock absorption. The flexible layer 406 may be selected to provide an amount of flexible support for both the top cover 312 and the scintillator 404, and may comprise a foam rubber type of material. The layers just described comprising the core layered structure each may generally be formed in a rectangular shape and defined by edges arranged orthogonally and disposed in parallel with an interior side of the edges 318 of the housing 314, as described in reference to FIG. 3.

A substrate layer 420 may be disposed under the imaging array 402, such as a rigid glass layer, in one embodiment, or a flexible substrate comprising polyimide or carbon fiber upon which the array of photosensors 402 may be formed to allow adjustable curvature of the array, and may comprise another layer of the core layered structure. Under the substrate layer 420 a radio-opaque shield layer 418, such as lead or flexible lead foil, may be used as an x-ray blocking layer to help prevent scattering of x-rays passing through the substrate layer 420 as well as to block x-rays reflected from other surfaces in the interior volume 450. Readout electronics, including the scanning circuit 28, the read-out circuit 30, the bias circuit 32, and processing system 36 (all shown in FIG. 1) may be formed adjacent the imaging array 402 or, as shown, may be disposed below frame support member 416 in the form of integrated circuits (ICs) electrically connected to printed circuit boards (PCBs) 424, 425. The imaging array 402 may be electrically connected to the readout electronics 424 (ICs) over a flexible connector 428 which may comprise a plurality of flexible, sealed conductors known as chip-on-film (CoF) connectors.

X-ray flux may pass through the radiolucent top panel cover 312, in the direction represented by an exemplary x-ray beam 16, and impinge upon scintillator 404 where stimulation by the high-energy x-rays 16, or photons, causes the scintillator 404 to emit lower energy photons as visible light rays which are then received in the photosensors of imaging array 402. An optional frame support member 416 may connect the core layered structure to the housing 314 and may further operate as a shock absorber by disposing elastic pads (not shown) between the frame support beams 422 and the housing 314. In embodiments disclosed herein for flexible positioning of DR detectors, a frame support member 416 may be omitted. Fasteners 410 may be used to attach the top cover 312 to the housing 314 and create a seal therebetween in the region 430 where they come into contact. In one embodiment, an external bumper 412 may be attached along the edges 318 of the DR detector 400 to provide additional shock-absorption.

Recently, processes have been developed that enable fabrication of the image sensor array onto durable thin substrates such as polyimide. This highly durable substrate enables the use of alternative housing components that are lighter in weight since a glass substrate is not used.

The discussion above is merely provided for general background information and is not intended to be used as an aid in determining the scope of the claimed subject matter.

BRIEF DESCRIPTION OF THE INVENTION

A flexible digital radiographic detector assembly includes a flexible sleeve enclosing a photosensor array supported by a flexible substrate. Integrated circuit readout electronics are coupled to the photosensor array and to a circuit board having conductive contacts. The contacts engage a hand carried read out electronics box to initiate a read out of image data captured in the photosensor array and to display the image data on a screen in the read out electronics box. The flexible sleeve can receive the digital radiographic detector to conform the detector against a surface of a preselected structure. Advantages that may be realized in the practice of some disclosed embodiments of the DR detector include a light weight, flexible, durable DR detector assembly and processing images in the field, such as an outdoor environment.

In one embodiment, a flexible digital radiographic detector includes integrated circuit readout electronics coupled to a photosensor array in the detector. A flexible sleeve encloses the photosensor array. A circuit board secures the integrated circuit readout electronics and includes conductive contacts for reading out image data captured by the photosensor array. A read out electronics box includes electrical contacts for engaging the circuit board and a display for displaying an image captured by the photosensor array.

In one embodiment, a method of operating a flexible digital radiographic detector assembly with a photosensor array includes adhering the flexible DR detector assembly onto a curved structure. A radiographic image of the curved structure is captured in the photosensor array. The flexible DR detector is inserted into a hand carried portable read out box having a digital display which reads out and displays the radiographic image of the curved structure.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIGS. 7A-7B are perspective views of exemplary sensor-side core components of a DR detector;

FIGS. 8A-8B are exploded perspective views of final DR detector assembly;

FIGS. 10A-C illustrate a sleeve for the encapsulated flexible image sensor array assembly; and FIGS. 11A-D illustrate a readout electronics box for different size detectors.

DETAILED DESCRIPTION OF THE INVENTION

Figures 5A, 5B:
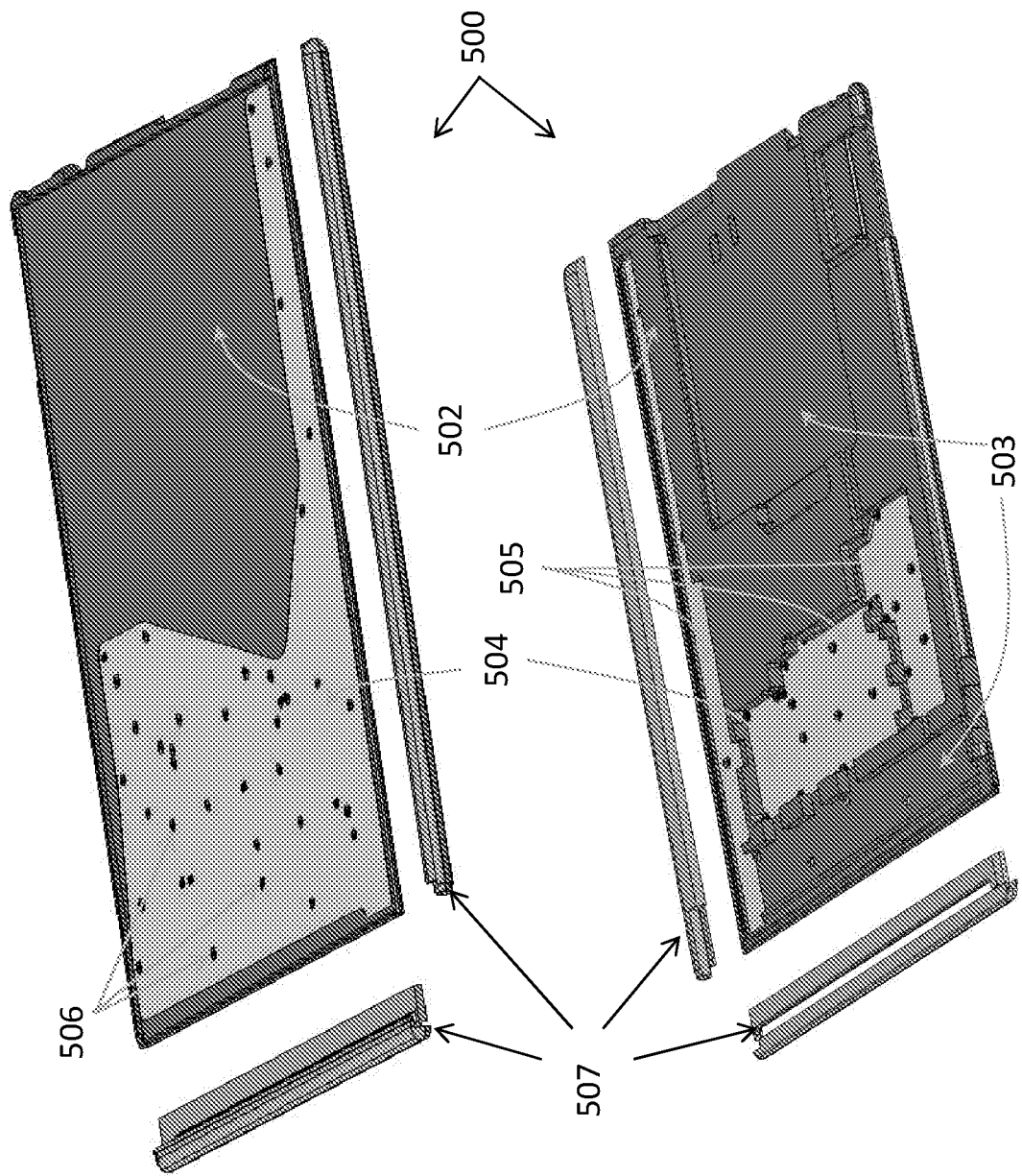
FIGS. 5A-5B are perspective views of exemplary core components of a DR detector.

Referring to FIGS. 5A and 5B, there is illustrated a multi layered DR detector core 500 having a substantially planar, rectangular high density foam layer 502 machined to form recessed pockets 503 on two major sides thereof. A plate 504 formed from a metal, such as aluminum, is positioned in a recessed pocket on a top side of the foam layer 502 as shown in FIG. 5A. The metal plate, or ground plane, 504 may be glued to the foam layer 502 to secure it in position. Recessed pockets 503 are also machined in a bottom side of the foam layer 502 as shown in FIG. 5B, which bottom side pockets 503 will have electronic components placed therein. The foam layer 502 is also machined to form cutouts 505 therethrough wherein printed circuit boards and other electronics may be placed therein and positioned against the ground plane 504, as described herein. The ground plane 504 functions as an electrical ground for the electronic components to be assembled as described herein. As shown in FIG. 5B, the metal ground plane 504 is visible through the cutouts 505.

The metal ground plane 504 includes a plurality of holes 506, some of which may be threaded, for attaching electrical and mechanical components. Protective end caps 507, also made from the same or similar high density foam as the foam layer 502 are positioned along the edges of the foam layer 502 after electronic components are positioned thereon. As referred to herein, a width dimension of the multi layered core 500 is parallel to the shorter sides thereof as compared to the length dimension which is parallel to the longer sides of the multi layered core 500. The top and bottom sides of the multi layered core 500, as shown in FIGS. 5A and 5B, respectively, together with further detector assembly layers as described herein may be referred to as major surfaces of the multi layered core 500. As shown in FIG. 5A, an area of the top side major surface of the multi layered core 500 made from the foam layer 502 may be about the same or greater than an area made from the metal ground plane 504. According to embodiments of the multi layered core 500 disclosed herein, an area of the metal ground plane 504 may be designed to cover from about 40% of the top side major surface area or up to about 65% of the top side major surface area. The foam used for foam layer 502 and the end caps 507, and other foam components described herein may include high density, thermoplastic, closed cell foams having good heat and flame resistance, heat and electrical insulating properties, a high strength to weight ratio and low moisture absorption. A high density foam such as a polyetherimide based thermoplastic foam or a poly vinylidene fluoride based foam may be used. Alternatively, the foam components may be formed from silicone or rubber.

Figures 6A, 6B:
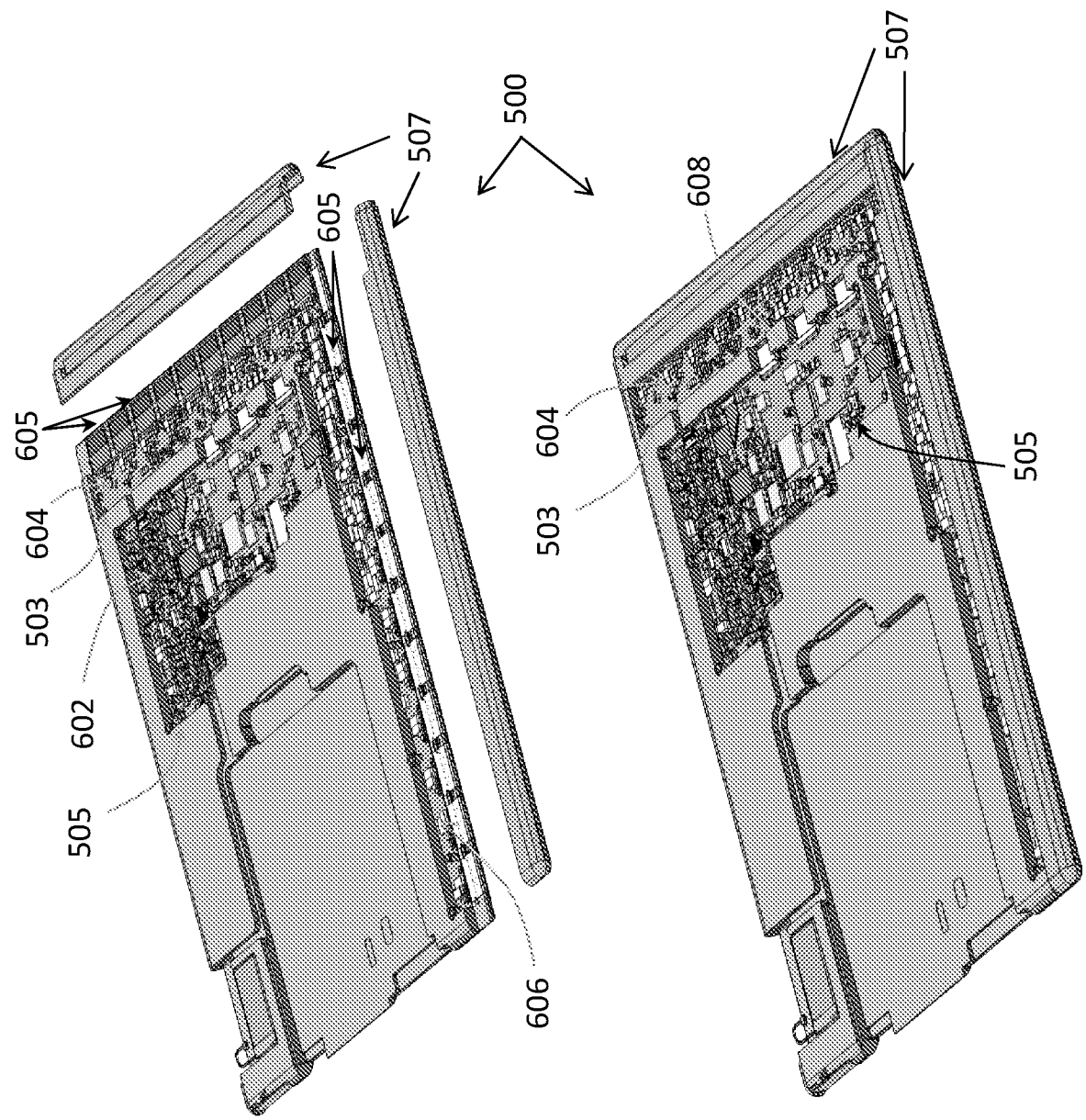
FIGS. 6A-6B are perspective views of additional exemplary board-side core components of a DR detector.

FIGS. 6A and 6B illustrate the bottom side of the multi layered core 500 having PCBs placed in the cutouts 505 and recessed pockets 503. The PCBs 602, 606, 608, placed in the cutouts 505 abut the grounding plane 504 and may be connected thereto using screws through the PCB into the holes 506 of the grounding plane 504. The screws may be used to electrically connect the PCBs to the grounding plane 504 or they may be separately electrically connected together. The PCB 604 is positioned in the recessed pocket 503. The PCBs may include, for example, a power distribution electronics PCB 602, a PCB 604 containing read out integrated circuits (ROICs), a PCB 606 for gate driver circuitry, and a PCB 608 having a main processor section. Some of the PCBs having the gate driver circuitry 606 and/or the ROICs 604 may include conductive communication lines (CoFs) 605 extending from the PCBS 604, 606, around an edge of the foam layer 502 and ground plane 504 assembly to enable digital communication between the PCB electronics and the radiographic sensor array on the top side of the multi layered core 500 which includes the two-dimensional array of photo-sensitive cells, as described herein. As shown in FIG. 6B, the protective foam ends caps 507 may be positioned on the edges of the foam layer 502 and ground plane 504 assembly over the CoFs 605.

Figure 1:
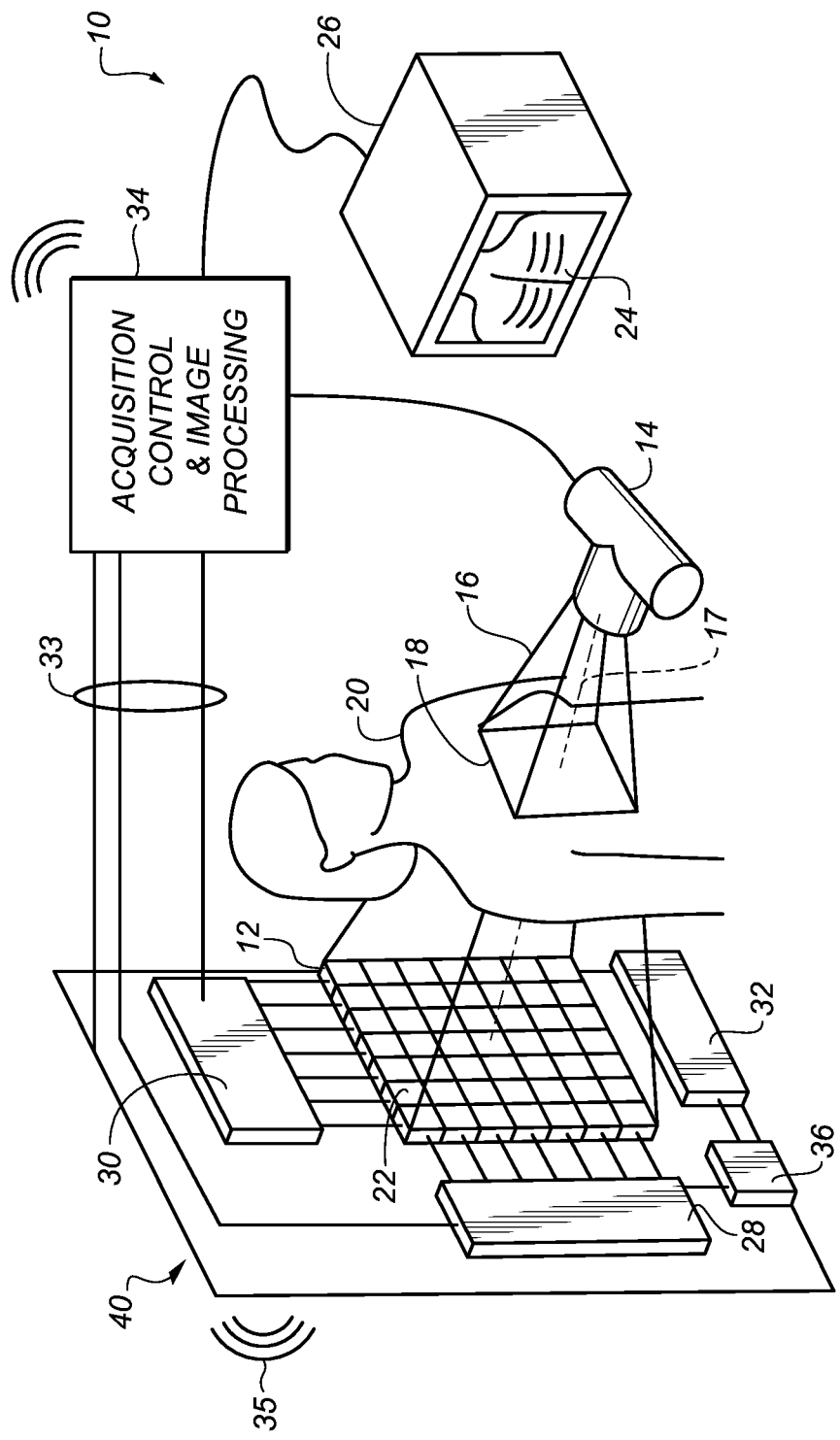
FIG. 1 is a schematic perspective view of an exemplary x-ray system.
Figure 2:
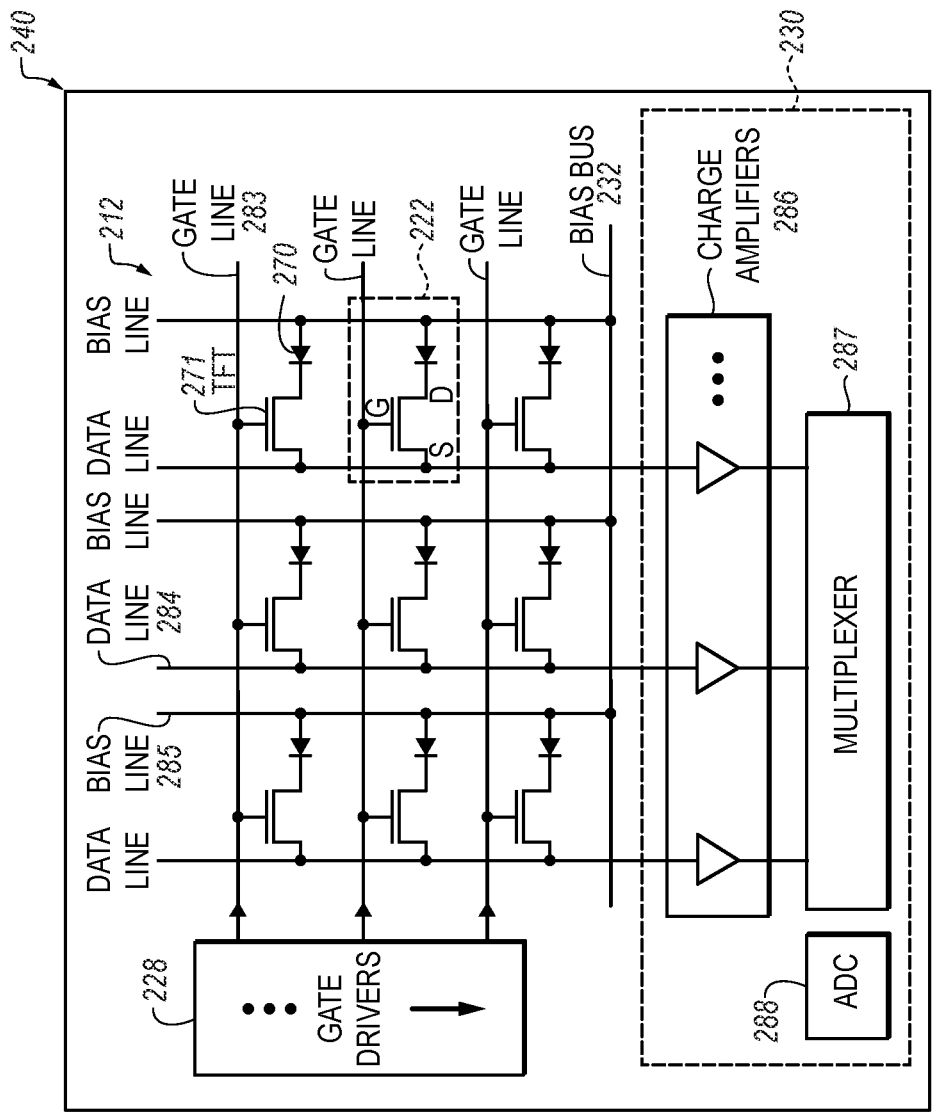
FIG. 2 is a schematic diagram of a photosensor array in a radiographic detector.
Figure 3:
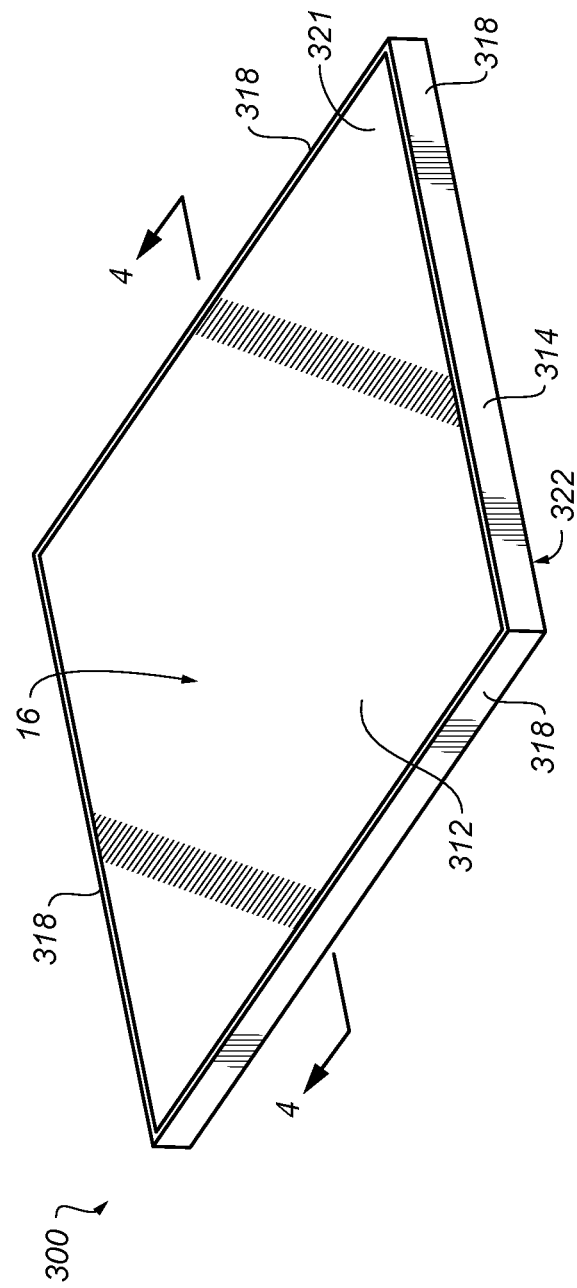
FIG. 3 is a perspective diagram of an exemplary DR detector.
Figure 4:
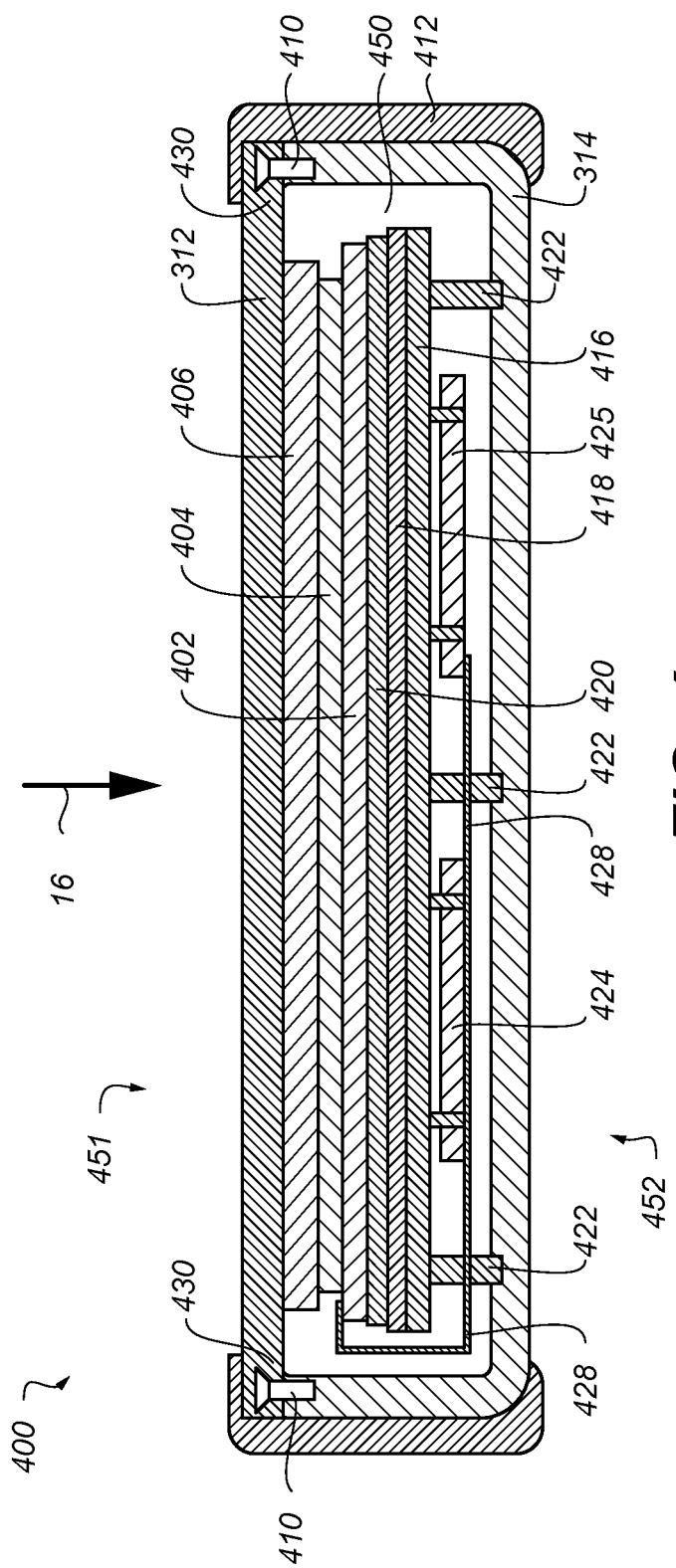
FIG. 4 is a cross section diagram of an exemplary DR detector.

FIGS. 7A-7B illustrate the top side of the multi layered core 500. A lead layer 702 is positioned against the top side of the multi layered core 500 to provide shielding against x-rays that may scatter near the DR detector assembly. The lead layer 702 has an area substantially equivalent to an area of a major surface of the multi layered core 500 and, in the embodiments described herein, is the only metal layer in the multi layered core 500 having as extensive an area as the multi layered core 500 itself. The metal grounding plane 504 may, at most, cover about 65% of the area covered by the lead layer 702, as mentioned herein. A sensor layer 704 which may comprise a scintillator layer laminated onto the two-dimensional array of photosensitive cells, is placed on the lead layer 702 and is seated on the top side of the multi layered core 500 as shown in FIG. 7B. The sensor layer 704 may further include a polyimide substrate upon which the two-dimensional array of photosensors is formed, which, in turn, includes a scintillator layer thereon, similar to the core layers of FIG. 4. The substrate may include a rigid glass substrate or it may be formed as a flexible substrate such as a polyimide substrate. Finally, a shock absorbing foam layer 706 is positioned on top of the substrate/sensor/scintillator layers 704 and typically abuts an inside surface of an enclosure for the multi layered core 500. Altogether, the multi layered core 500 has a thickness of between about one-eighth inch and about one-half inch including the PCB circuitry attached thereto.

FIGS. 8A-8B illustrate the top and bottom sides, respectively, of the multi layered core 500, as assembled, being inserted into an open end 803 of an enclosure, or housing, 800 which enclosure 800 may also be referred to as having corresponding top and bottom sides. A bottom side of the enclosure 800, as shown in FIG. 8B, includes an opening 801 for a battery 802 to be placed therethrough into a corresponding recessed pocket 503 of the foam layer 502 after the multi layered core 500 is fully inserted into the enclosure 800. Subsequently, an enclosure end cap 802 may be positioned in the open end 803 of the enclosure to seal the open end 803 of the enclosure 800 and complete the assembly of the DR detector 900 (FIG. 9). Such an end cap 802 may be formed out of aluminum and positioned in thermal contact with one or more of the PCBs, as described herein. The open end 803 may have a height of between about one-eighth inch and about one-half inch, similar to the thickness of the multi layered core 500 to allow slidable entry of the multi layered core 500 through the open end 803. In one embodiment, the shock absorbing foam layer 706 may be compressed to half its thickness upon the multi-layered core 500 being inserted into the enclosure 800. The enclosure 800, as shown, is a carbon fiber based material such as a twill type of carbon fiber, however, other carbon fiber types of enclosures may be used such as carbon fiber embedded plastics. In addition to carbon fiber, magnesium, aluminum, and plastic enclosures may be used, similar in form as the carbon fiber enclosure 800.

Figure 9A:
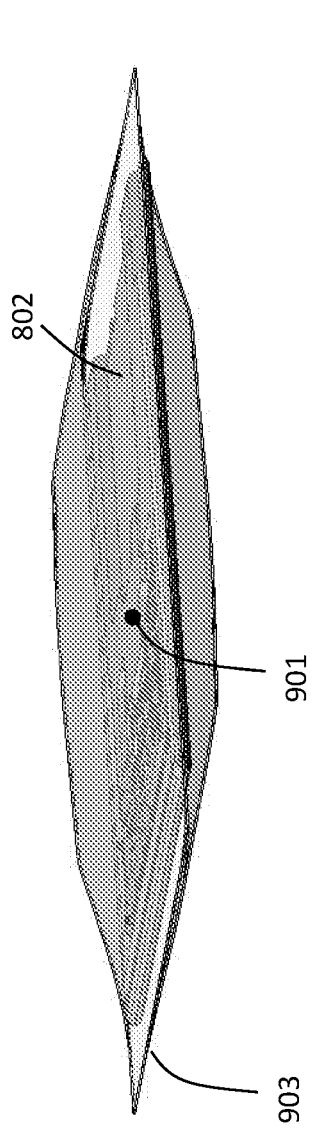
FIGS. 9A-B illustrate an encapsulated flexible image sensor array assembly.
Figure 9C:
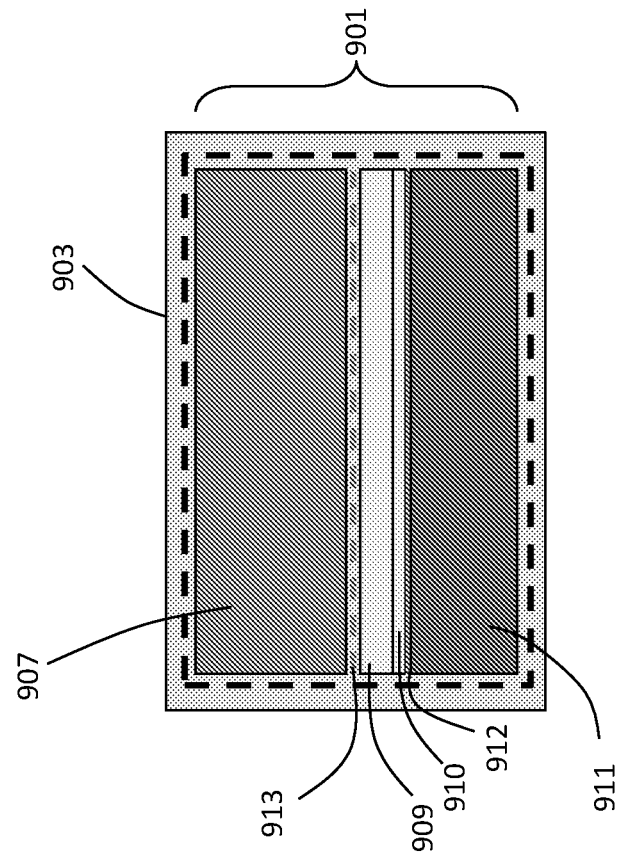
FIG. 9C is a cross section of the encapsulated flexible image sensor array assembly of FIG. 9B.
Figure 9B:
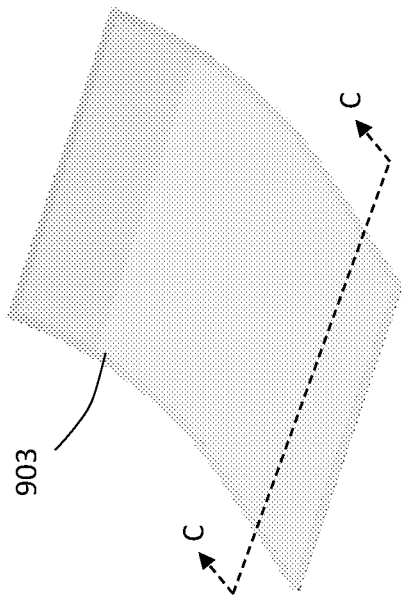

FIGS. 9A-C illustrate an embodiment of a flexible core sensor array assembly 901, without housing 800. FIG. 9C is a cross-section view along section line C-C of FIG. 9B. As described herein, sensor array assembly 901 may be used in outdoor, possibly remote, environments for capturing radiographic images of industrial equipment exposed by a high power x-ray source. The various x-ray sources usable in outdoor industrial environments are well known to those skilled in the art and will not be separately described herein. Flexible core sensor array assembly 901, with battery 802, is enclosed or encapsulated in a flexible, sealed envelope, sleeve, or bag 903. Fabrication of the flexible sensor array assembly 901 comprising the flexible substrate 910 is described herein and in published PCT patent application WO2018/212744A1 entitled FLEXIBLE SUBSTRATE MODULE AND FABRICATION METHOD. The flexible sleeve or envelope 903 may be made using a polyimide film, such as Kapton developed by DuPont, or Ultem developed by GE and made from polyetherimide (PEI) resins, or very thin FR4, or it may be a metalized bag to protect against electromagnetic interference. The sleeve 903 is preferably sealed to protectively enclose the flexible sensor array assembly 901 against contaminants, moisture and other elements such as in a challenging outdoor environment. One layer of the sensor array assembly 901 may include a scintillator layer 907 which may include a GOS based or Cesium based scintillator. The sensor array layer 909 may include a sensor array formed on a flexible polyimide substrate layer 910, which may be further supported by another flexible polyimide substrate 911. The sensor array layer 909 and flexible polyimide substrate 910 may be adhered to the additional flexible substrate 911 by a layer of adhesive 912 therebetween.

The envelope 903 may include an open side, or edge, whereby the sensor array assembly 901 is inserted therein. In addition, a slip plane 913, may be formed between the scintillator 907 and the sensor array layer 909. In addition, a slip plane may also be formed between the sensor array layer 909 and the substrate 911 in the same position, and instead of, the adhesive layer 912, to allow sliding engagement therebetween. In one embodiment, to facilitate a slight bending of the sensor array assembly 901 around a large radius object, a slip plane 913 may not be formed between the scintillator 907 and the sensor array layer 909 or the sensor array layer 909 and the substrate 911 to maintain a desired fixed or high friction engagement therebetween. The more layers that are affixed or adhered to each other in a layered stack, the stiffer and less flexible the stack becomes which may introduce limitations as to how small a bending radius may be achieved. The polyimide portion of the sensor array layer 909 may include a thickness between about 10 um and about 100 um, preferably between about 30 um and 50 um. The substrate layer 911 may include a thickness of about 50 um up to about 350 um, preferably between about 150 and 250 um. Characteristics such as durability of the sensor array assembly 901 may be increased with greater thickness of the substrate 911, while flexibility may be increased with lesser thickness of the substrate 911.

In one embodiment, as shown in the top view of FIGS. 10A-B, the sleeve or envelope 903 may be formed by placing two sheets, or layers, of a selected encapsulation material, having a greater area than the sensor assembly 901, one on a top side of the sensor array assembly 901 and another on a bottom side of the sensor array assembly 901 and then adhering their edges together around the periphery 905 of the sensor array assembly 901. In one embodiment, one or both of such sheets may include adhesive on an interior surface within the periphery 905 to securely attach the encapsulation material to the sensor array assembly 901 and prevent one or both of the top and bottom sides of the sensor array assembly 901 from sliding against the interior surfaces of envelope 903. In one embodiment, one or both of such sheets may be laminated to top and/or bottom sides of the sensor array assembly 901. In one embodiment, the envelope 903 includes adhesive only along its interior facing edges outside of the periphery 905 so as to allow the sensor array assembly 901 to slide against the interior surfaces of the envelope 903 within the periphery 905 that does not contain adhesive. This sliding engagement may be useful for applications where the sensor array assembly 901 is bent around a small radius object to be radiographically imaged. In one embodiment, the envelope 903 may be vacuum sealed around the sensor array assembly 901.

FIGS. 10A-B show a top view of the sealed sensor array assembly 901 whereby read-out integrated circuits (ROICs) 1001 are disposed on a PCB 1002 and are electrically connected to the sensor array assembly 901. A processor or controller 36, also disposed on PCB 1002, controls readout and image processing of captured x-ray images as described herein, as well as controlling transmission of captured image data to a portable electronic read out box via conductive electric contacts 1005, as described herein. The ROICs 1001 and PCB 1002 are included within the encapsulation envelope, or sleeve, 903 in one embodiment as shown in FIG. 10A. In another embodiment, the ROICs 1001 are electrically connected to the sensor array assembly 901 through perforations, or one or more slits, in the encapsulation sleeve 903, and so are not included within the encapsulation sleeve 903, as shown in FIG. 10B. In one embodiment, the flexible sleeve 903 may be made from a flexible rubber having temperature tolerance such as a high temperature silicone material. The flexible sleeve 903 may be selected for specific applications of the sensor array assembly 901. The flexible sleeve 903 could be tacky on an exterior surface, or portion thereof, such as having an adhesive 1004 applied to at least one external side thereof, such as a repositionable adhesive, to facilitate repeated attachment of the flexible sensor array assembly 901 on different sections of a pipe, such as an oil or gas delivery pipe, for radiographically imaging different portions of the pipe. The flexible sleeve 903 could be shaped, such as shown in FIG. 10C, to fit a specific desired structure such as an inside or outside section of an elbow portion of a pipe, so that, after inserting the sensor array assembly 901 therein, the sensor array may be quickly conformed against the structure to be imaged. The sensor array assembly 901 may also be inserted into a standard cassette or carbon fiber housing for standard rigid planar detector imaging applications as shown in FIG. 8A. The flexible sleeve 903 may be fabricated with a temporary sealing strip 1003 along one edge thereof, using a releasable mechanical engagement strip or a reusable adhesive strip, to temporarily seal together top and bottom sheets of the sleeve 903. The sealing strip 1003 may be released to allow insertion and removal of the sensor array assembly 901 into and out of the flexible sleeve 903.

The sleeve 903 may include a lead (Pb) layer in one side, or sheet, thereof for suitable applications where the radiopaque lead layer may be advantageous. The sleeve may include conductive layers. The flexible sleeve 903 may be made from temperature resistant material for application in high heat regions or applications proximate to flames or welding equipment. The flexible sleeve 903 may be made from UV resistant material, or tacky material to assist in being retained in a desired position, or low friction material to facilitate insertion into small gaps.

FIGS. 11A-B are perspective views of an electronic, portable read out box 1101, which is small enough and light enough to be hand carried to remote locations where radiographic imaging of industrial installations may be performed. FIGS. 11C-D are top and side view schematic diagrams, respectively, of the read out box 1101 of FIGS. 11A-B. The read out box 1101 includes conductive electric contacts 1102 configured to electrically engage the electric contacts 1005 of the sensor array assembly 901 when the edge of the PCB 1002 is inserted into the slot 1103 of the read out box 1101. A readout box controller 1104, which includes electronic image storage, communicates with the read out box contacts 1102 to sense insertion of the sensor array assembly 901 when the read out box contacts 1102 electrically engage the detector contacts 1005, when the sensor array assembly 901 is inserted into the slot 1103 of the read out box 1101. Controller 1104 is configured to communicate with ROICs 1101 and/or processor 36 to commence downloading captured image data from the sensor array assembly 901 into image storage of the read out box 1101. Readout box 1101 includes a digital display 1105 controlled by controller 1104 for displaying a downloaded image captured by the sensor array assembly 901. Read out box 1101 may also include a printer (not shown) for printing images captured by the sensor array assembly 901. A power source, such as a battery 1106, provides power to operate read out box 1101, as described herein. As shown in FIGS. 11A-B, different sizes of a sensor array assembly 901 may be used in read out box 1101.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A flexible digital radiographic detector comprising:
   a flexible photosensor array comprising a two-dimensional array of photosensitive cells each configured to capture an amount of radiographic radiation which altogether forms a radiographic image;
   a scintillator layer adjacent a first side of the flexible photosensor array and a flexible substrate adjacent a second side of the photosensor array opposite the first side;
   integrated circuit readout electronics coupled to the photosensor array for reading out an amount of radiographic radiation absorbed in each of the photosensitive cells, the integrated circuit readout electronics including electrical detector contacts configured to electrically engage electrical readout device contacts for reading out the radiographic image;
   a sealed flexible envelope enclosing the flexible photosensor array, the scintillator layer, the flexible substrate, and the integrated circuit readout electronics; and
   a hand carried read out electronics box comprising the electrical readout device contacts to initiate the reading out of the radiographic image captured in the photosensor array.

2. The detector of claim 1, further comprising a circuit board for supporting the integrated circuit readout electronics, the circuit board comprising the electrical detector contacts.

3. The detector of claim 2, wherein the hand carried read out electronics box comprises a slot to receive the electrical detector contacts edge of the circuit board.

4. The detector of claim 3, wherein the board comprises a length about half a length of the slot.

5. The detector of claim 1, wherein the hand carried read out electronics box comprises a display screen to display the radiographic image captured in the photosensor array.

6. The detector of claim 5, wherein the hand carried read out electronics box comprises a printer to print the radiographic image captured in the photosensor array.

7. The detector of claim 1, wherein the flexible envelope includes an adhesive surface for adhering the photosensor array onto a curved surface.

8. A method of operating a flexible digital radiographic (DR) detector having a photosensor array, a scintillator layer adjacent the photosensor array, and a flexible substrate adjacent the photosensor array, the method comprising:
   enclosing the photosensor array, the scintillator layer, and the flexible substrate in a sealed flexible envelope;
   adhering one side of the sealed flexible envelope onto a curved structure;
   capturing a radiographic image of the curved structure in the photosensor array;
   inserting the flexible DR detector into a hand carried portable read out box, the read out box including a digital display; and
   reading out and displaying the radiographic image of the curved structure using the read out box.

9. The method of claim 8, further comprising engaging contacts on the DR detector with contacts in the read out box during the step of inserting.

10. The method of claim 9, further comprising inserting the flexible DR detector into a slot of the hand carried portable read out box and electrically engaging the contacts in the read out box.

11. The method of claim 8, wherein the step of adhering comprises placing an adhesive on the one side of the sealed flexible envelope.

12. The method of claim 8, further comprising printing the radiographic image of the curved structure using a printer in the read out box.

13. A flexible digital radiographic detector comprising:
   a flexible photosensor array comprising a two-dimensional array of photosensitive cells each configured to capture an amount of radiographic radiation which altogether forms a radiographic image;
   a scintillator layer adjacent a first side of the flexible photosensor array and a flexible substrate adjacent a second side of the photosensor array opposite the first side;
   integrated circuit readout electronics coupled to the photosensor array for reading out an amount of radiographic radiation absorbed in each of the photosensitive cells, the integrated circuit readout electronics including electrical detector contacts configured to electrically engage electrical readout device contacts for reading out the radiographic image;
   a sealed flexible envelope enclosing the flexible photosensor array, the scintillator layer, and the flexible substrate, wherein the integrated circuit readout electronics are not within the sealed flexible envelope and are electrically connected to the flexible photosensor array through perforations in the sealed flexible envelope; and
   a hand carried read out electronics box comprising the electrical readout device contacts to initiate the reading out of the radiographic image captured in the photosensor array.

14. The detector of claim 13, further comprising a circuit board for supporting the integrated circuit readout electronics, the circuit board comprising the electrical detector contacts.

15. The detector of claim 14, wherein the hand carried read out electronics box comprises a slot to receive the electrical detector contacts of the circuit board.

16. The detector of claim 15, wherein the circuit board comprises a length about half a length of the slot.

17. The detector of claim 13, wherein the hand carried read out electronics box comprises a display screen to display the radiographic image captured in the photosensor array.

18. The detector of claim 17, wherein the hand carried read out electronics box comprises a printer to print the radiographic image captured in the photosensor array.

19. The detector of claim 13, wherein the flexible envelope includes an adhesive surface for adhering the photosensor array onto a curved surface.

* * * * *

UNITED STATES PATENT AND TRADEMARK OFFICE
CERTIFICATE OF CORRECTION

| | |
|---|---|
| PATENT NO. | : 11,852,756 B2 |
| APPLICATION NO. | : 17/778420 |
| DATED | : December 26, 2023 |
| INVENTOR(S) | : Todd D. Bogumil et al. |

It is certified that error appears in the above-identified patent and that said Letters Patent is hereby corrected as shown below:

In the Claims

Column 13, Claim 3, Line 65 — Please replace "detector contacts edge of the circuit board." with --detector contacts of the circuit board.--

Column 13, Claim 4, Line 66-67 — Please replace "wherein the board comprises a length about half a length of the slot." with --wherein the circuit board comprises a length about half a length of the slot.--

Signed and Sealed this
Thirtieth Day of January, 2024

Katherine Kelly Vidal
*Director of the United States Patent and Trademark Office*